United States Patent [19]

Meyer et al.

[11] Patent Number: 5,134,777
[45] Date of Patent: Aug. 4, 1992

[54] ADJUSTABLE STROKE RECIPROCATING MECHANISM FOR A POWER TOOL

[75] Inventors: Dieter B. Meyer, Aurora; Mark S. Talesky, Chicago, both of Ill.

[73] Assignee: Skil Corporation, Chicago, Ill.

[21] Appl. No.: 803,093

[22] Filed: Dec. 5, 1991

[51] Int. Cl.⁵ .................. B23D 49/04; B23D 49/06; F16H 21/18
[52] U.S. Cl. .................. 30/392; 30/393; 74/50
[58] Field of Search .................. 30/392, 393, 394; 74/50, 49, 48, 47, 46, 567, 569

[56] References Cited

U.S. PATENT DOCUMENTS

| | | | |
|---|---|---|---|
| 3,750,483 | 8/1973 | Burrows et al. | 30/392 |
| 3,788,403 | 1/1974 | Mitchell | 74/50 |
| 4,031,763 | 6/1977 | Eizenberg | 30/592 |
| 4,976,164 | 12/1990 | Lentino | 74/50 |
| 5,078,017 | 1/1992 | Zornes | 74/50 |

Primary Examiner—Douglas D. Watts
Assistant Examiner—Paul M. Heyrana, Sr.
Attorney, Agent, or Firm—Jones, Day, Reavis & Pogue

[57] ABSTRACT

The ram of the reciprocating saw is driven by a scotch yoke mechanism. A planetary gear system consisting of a ring gear and an idler gear imparts an elliptical or linear path of movement to the pin forming part of the scotch yoke mechanism. The ring gear may be adjustably positioned for changing its relationship relative to the idler gear thereby varying the orientation of the elliptical or linear path of movement of the drive pin for varying the stroke of reciprocation of the ram which is connected to the saw blade holder. Actuation of the ring gear to its desired position automatically causes the foot plate of the saw to be located in its desired position for the selected stroke of movement.

12 Claims, 5 Drawing Sheets

ADJUSTABLE STROKE RECIPROCATING MECHANISM FOR A POWER TOOL

FIELD OF THE INVENTION

The present invention relates to powered mechanisms for reciprocating a working tool, such as a saw blade, and more particularly to means for adjusting the stroke of the reciprocating member forming part of such mechanisms.

BACKGROUND OF THE INVENTION

The present invention has applicability to power tools, and in particular to power tools having reciprocating drive mechanisms. Jigsaws and other reciprocating saws (referred to in the trade as "recipro" saws) are the most common types of power tools having a reciprocating drive mechanism. However, it will be understood that the present invention has general applicability to any power tool that utilizes a reciprocating drive mechanism.

Reciprocating saws of the general type to which the present invention pertains typically comprise an electric motor arranged to drive a reciprocating saw blade drive mechanism, which may be of the scotch yoke type. More particularly, the motor shaft is mechanically coupled to a crank plate having an eccentrically located crank pin that is drivingly received within the slot of a reciprocating yoke member. The yoke member is coupled to the saw blade plunger sometimes referred to as a ram.

Mechanisms of the type described, although generally satisfactory, do not provide a means for adjusting the stroke of the reciprocating member. As is known to those skilled in the art, it is desirable to be able to vary the stroke of a reciprocating saw blade depending on the nature of the work being cut.

Reciprocating saws and jigsaws are used to cut a variety of materials, including materials which differ widely in density. As is known to those skilled in the art, as a general rule it is desirable when cutting soft materials to provide the saw blade with a rather large stroke, say two inches for purposes of illustration. On the other hand, when cutting hard materials it is desirable to provide the blade with a much shorter stroke, say a stroke of one inch for purposes of illustration. Thus, it is very desirable to provide an adjustable stroke reciprocating mechanism thereby to permit the tool to cut efficiently irrespective of the nature of the material being cut.

Aside from varying the stroke of the saw blade to accommodate materials of varying properties, it is also advantageous to be able to shorten the stroke of the saw blade to be able to cut objects in cramped or confined environments. Minimizing the stroke of the blade in such an instance reduces the possibility of unintended contact between the tip of the blade and other objects in the vicinity of the member being cut.

Power tools of the type under consideration are provided with foot plates which engage the work being cut and which permit the operator to position the power tool relative to the work being cut. As is known to those skilled in the art, there is an optimum position for the foot plate for a given stroke of reciprocation. Consequently, it is desirable to adjust the foot plate automatically upon adjustment of the stroke of reciprocation such that the foot plate will be properly positioned for the selected stroke of reciprocation.

SUMMARY OF THE INVENTION

The present invention encompasses the provision of a planetary gear system for operating the reciprocating mechanism of a power tool. This gear system includes a ring gear and an idler gear. This planetary gear system provides the crank pin of the scotch yoke with an elliptical or linear path of movement rather than a circular path of movement. Means are provided to adjust the position of the ring gear relative to the idler gear thereby to vary the orientation of the path of the crank pin for adjusting the stroke of the yoke and the attached ram and blade holder.

A primary object of the present invention is the provision of an adjustable stroke mechanism of the type just described.

Another object of the present invention is the provision of an adjustable stroke mechanism of the type described in association with an adjustable foot plate, such that actuation of the mechanism for adjusting the stroke of the reciprocating member also serves to adjust the foot plate to an optimum position corresponding to the selected stroke of movement of the reciprocating member.

Still another object of the present invention is the provision of an adjustable stroke mechanism of the type described which can be manufactured at low cost.

DESCRIPTION OF THE DRAWINGS

FIG. 3 is a sectional view taken along the line 3—3 of FIG. 2;

DESCRIPTION OF THE INVENTION

Figure 1:
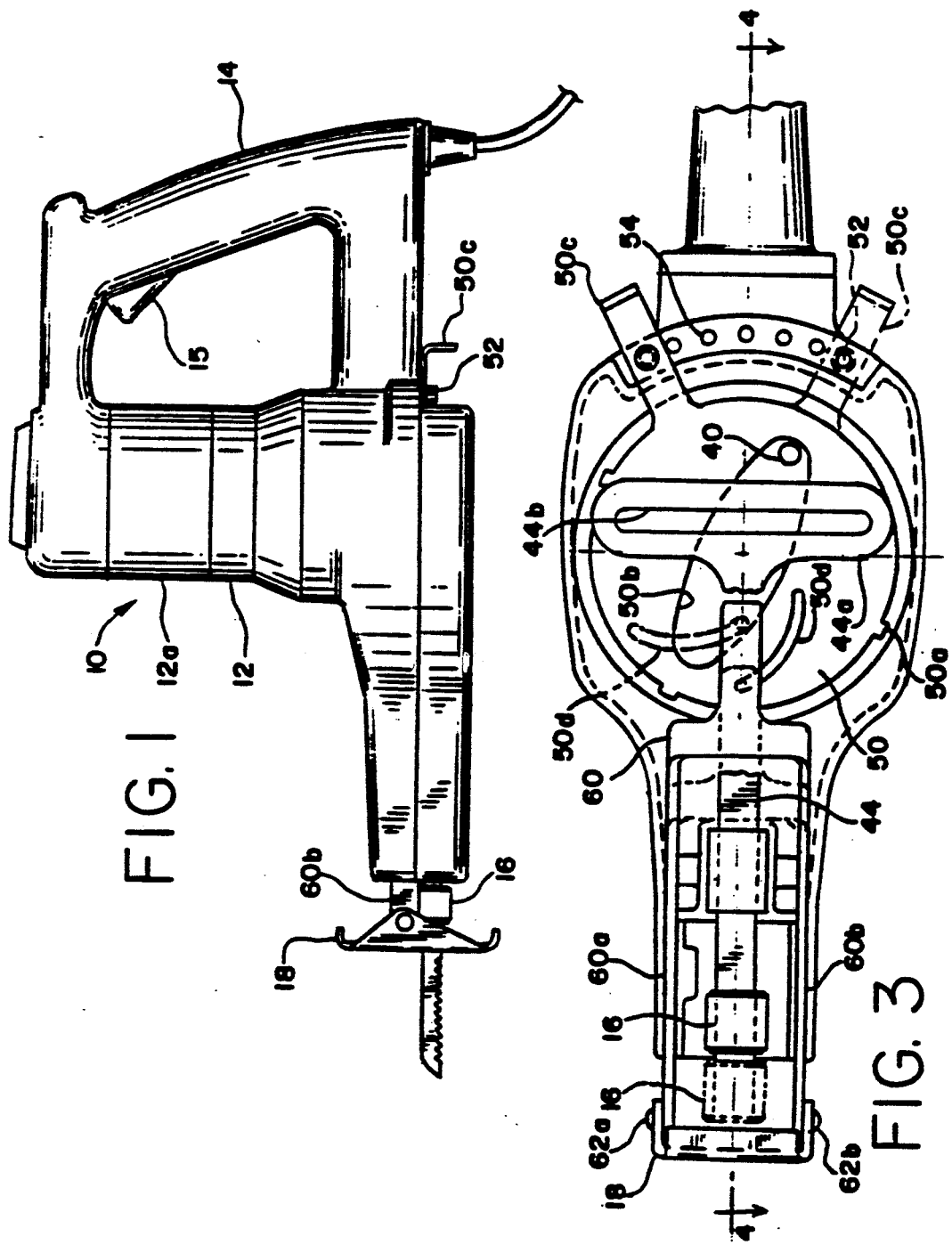
FIG. 1 is a side elevation view of a power operated, reciprocating saw embodying the present invention.

Referring first to FIG. 1, a preferred embodiment of the present invention is embodied in a portable power tool, generally designated 10. This tool is a reciprocating saw sometimes referred to in the trade as a "recipro" saw. However, it should be understood that the present invention is not to be limited to such a tool as the invention can be incorporated in other types of reciprocating saws, such as a jigsaw for example.

The tool 10 shown for purposes of illustration includes a housing 12 having a handle 14. This tool may be electrically or pneumatically operated. The tool 10 shown is electrically powered and to this end includes an electric motor (not shown) contained within housing portion 12a and adapted to be energized by the trigger switch 15. The tool includes a blade holder 16 and an adjacent foot plate 18.

Figure 2:
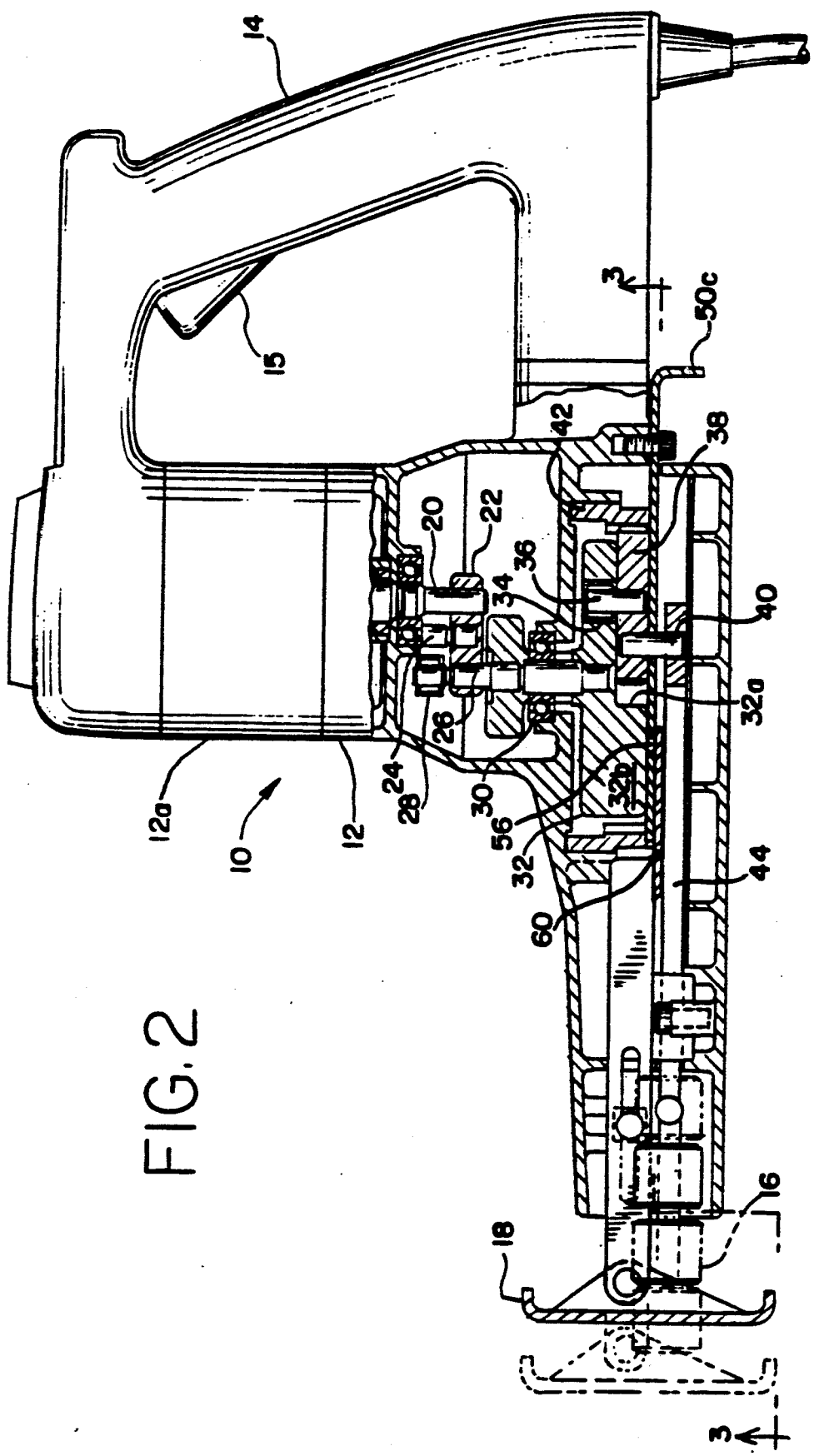
FIG. 2 is an enlarged, partial side elevation view of the tool of FIG. 1 with a portion of the tool housing removed for illustration of the adjustable stroke reciprocating mechanism.

Referring now to FIG. 2, the electric motor includes an armature or output shaft 20 which contains a series of teeth in meshing engagement with a reduction gear 22. This reduction gear is mounted for rotation about a pin 24, the latter being suitably supported by the tool housing. The reduction gear 22 meshes with teeth on a drive shaft 26, the latter being supported for rotation by bearing assemblies 28 and 30.

The drive shaft 26 is connected with a drive member 32 for rotating the latter. Drive member 32 includes a cavity 32a defining a counterweight 32b. The drive member 32 includes a bearing 34 mounting a drive pin 36. An idler gear 38 is mounted in the cavity 32a on the pin 36 for rotation about the axis of the latter. It will be seen that the idler gear 38 mounts a crank pin 40 in eccentric relationship with the axis of rotation of the idler gear 38 defined by the axis of the pin 36. Of course, the drive pin 36 is eccentric with respect to the axis of rotation of the drive member 32. The formation 32b acts as a counterweight for the gear 38 to provide for vibrationless rotation of the drive member 32.

The teeth on idler gear 38 mesh with complimentary teeth on the inside of a ring gear 42. The ring gear 42 is concentric with the drive shaft 26 and is mounted for rotation relative to the drive shaft.

A ram 44 is suitably mounted in the tool housing 12 for reciprocal movement. The ram 44 includes an end formation 44a (FIG. 3) having a rectilinear slot 44b formed therein. The slot 44b receives the pin 40 thus defining the well-known scotch yoke drive mechanism. The ram 44 is suitably supported for reciprocal movement and mounts the blade holder 16.

The ram 44 includes the yoke of a scotch yoke mechanism. It will be understood that the invention is not to be limited with a scotch yoke mechanism. The invention is applicable to other mechanisms for converting oscillatory movement of a crank pin to reciprocal movement of another member, such as a slider crank mechanism, for example.

A generally circular actuator plate 50 is suitably mounted within the tool housing for rotation about the axis of the drive shaft 26. The actuator plate 50 includes a plurality of projections 50a which are received within recesses in the ring gear 42 thereby connecting the actuator plate to the ring
gear. The actuator plate includes a generally elliptical opening 50b to accommodate movement of the crank pin 40. The shape of this opening is not critical and need be configured only for providing clearance for movement of the pin 40.

The actuator plate 50 includes an integral actuator lever 50c which may be swung back and forth between the solid and broken line positions shown in FIG. 3 for thereby rotating the actuator plate and the attached ring gear. A threaded fastener 52 is received within an aperture in the lever 50c and is arranged for being threadingly received in any one of a plurality of threaded bores 54 formed in the tool housing 12. Of course, other means can be provided for releasably retaining the actuator plate in any one of its selected positions.

The actuator plate 50 includes an arcuate slot 50d receiving a pin 56 carried by a yoke 60. The yoke 60 is of bifurcated construction including arms 60a, 60b which are suitably mounted by the tool housing for reciprocal movement in colinear relationship with the ram 44. The arms 60a, 60b act as links mounting respective fasteners 62a, 62b which in turn pivotally support the foot plate 18.

Figure 4:
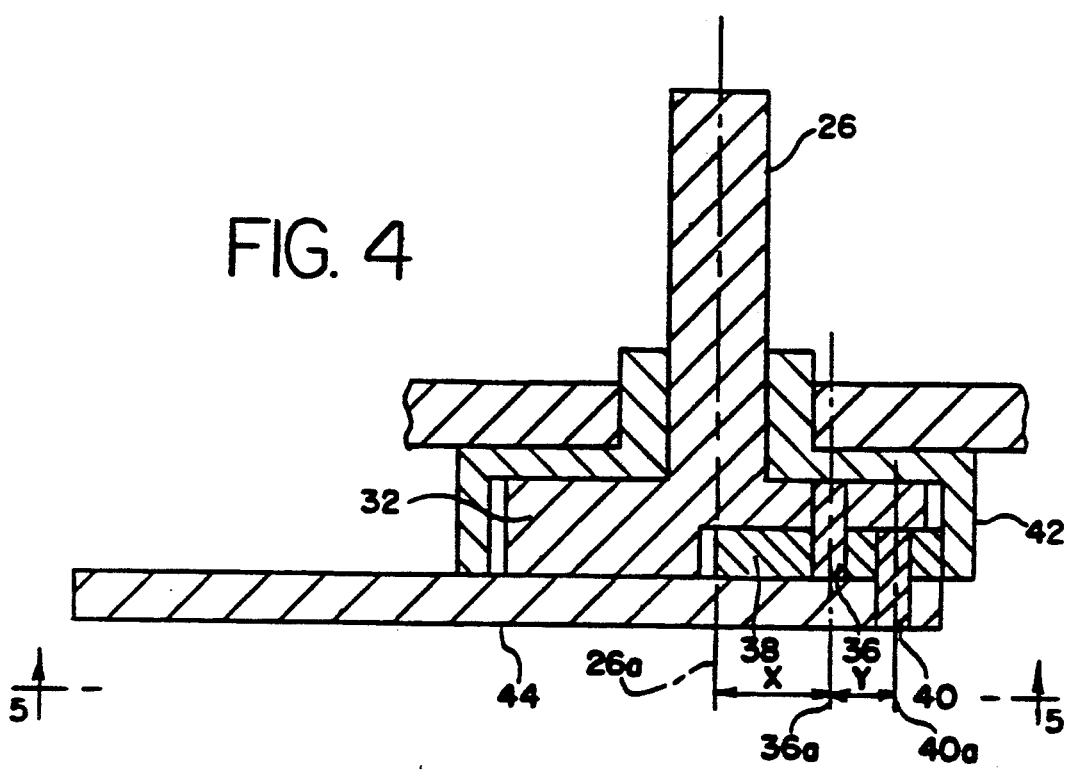
FIG. 4 is a section taken along the line 4—4 of FIG. 3 but presented in diagrammatic form.
Figure 5:
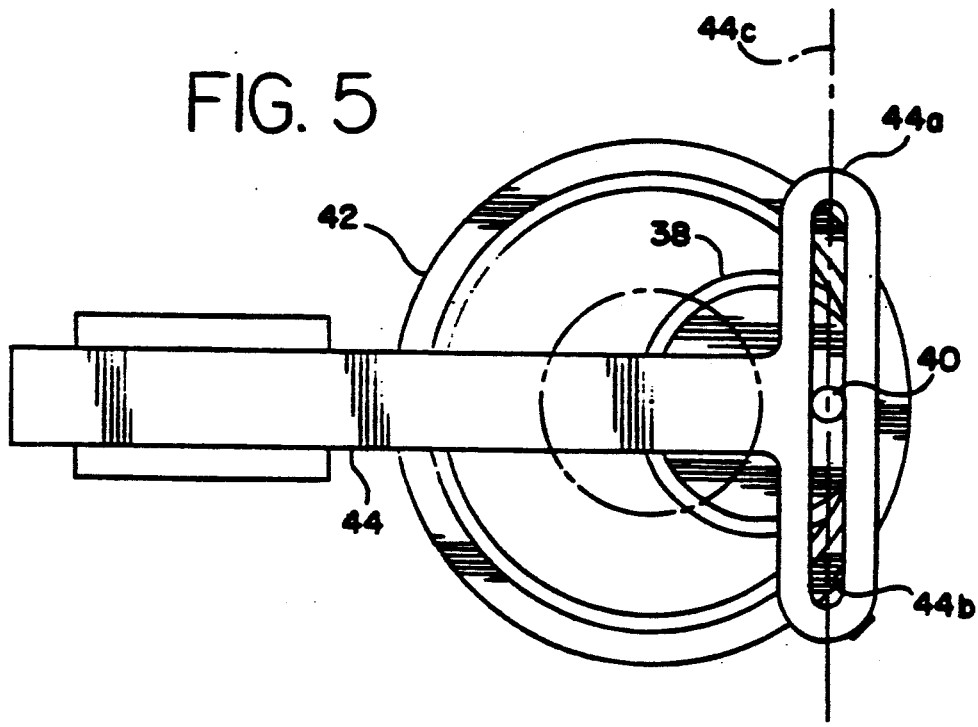
FIG. 5 is a bottom view taken along the line 5—5 of FIG. 4.

Referring to FIGS. 4 and 5, which show the invention in somewhat diagrammatic form, it will be appreciated by those skilled in the art of gear design that the gear ratio between the ring gear 42 and the idler gear 38 must be 2:1 to provide for a constant stroke of reciprocation of the plunger 44 for a selected position of the ring gear as determined by the orientation of the actuator plate 50. It will be understood that the drive pin 36 is driven in a circular path about the axis of shaft 26. Thus, the idler gear 38 will be bodily moved in a circular path about the shaft 26. However, as the idler gear is bodily rotated as just described, the idler gear also rotates about the pin 36 by reason of the meshing engagement between the teeth on the idler gear and the stationary ring gear. Consequently, elliptical movement will be imparted to the pin 40 by reason of the movements just described, by reason of the eccentric relationship between the pin 40 and the pin 36 and by the 2:1 ratio between the ring gear and the idler gear.

The operation of the adjustable stroke mechanism of the preferred embodiment of the present invention may be best understood by reference to FIGS. 6a–6c and FIGS. 7a–7c. When the actuator lever 50c is swung to the position shown in FIGS. 6a, 6b and 6c, the idler gear 38 will be oriented with respect to the ring gear 42 such that the crank pin 40 will move in the elliptical path designated 64. This elliptical path has its major axis perpendicular to the axis of reciprocation of the plunger 44. It will be appreciated that the idler gear 38 and ring gear 42 constitute a planetary gear system. It should be understood that the ring 42 is stationary when the pin 40 is being moved in its elliptical path for reciprocating the plunger 44 by reason of the scotch yoke mechanism constituted by the crank pin 40 and slot 44b.

Figure 7A:
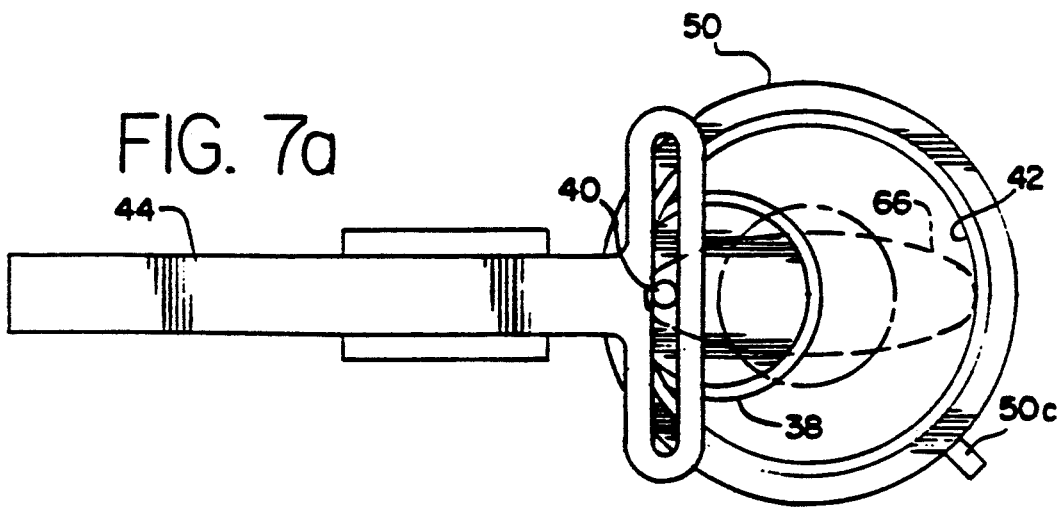
FIGS. 7a, 7b and 7c are sequential plan views in diagrammatic form showing the adjustable stroke mechanism in its configuration for providing the maximum stroke of movement.
Figure 7B:
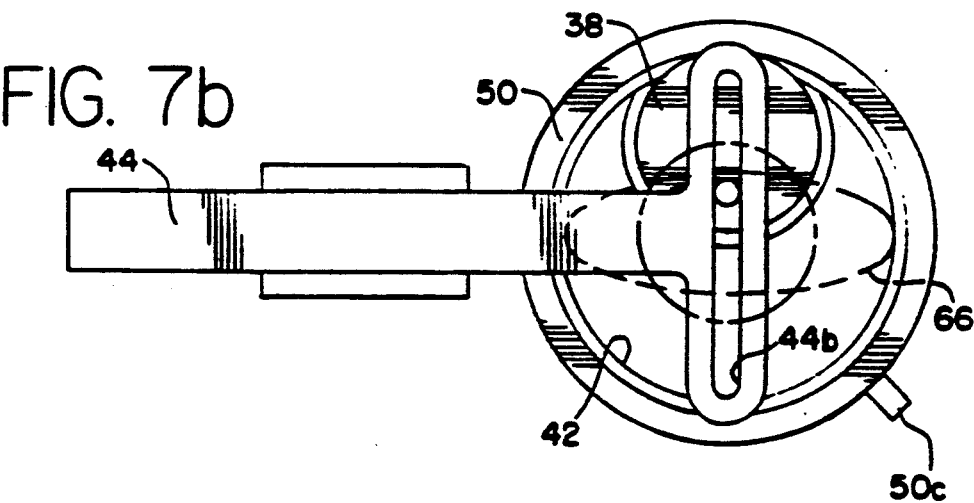
Figure 7C:
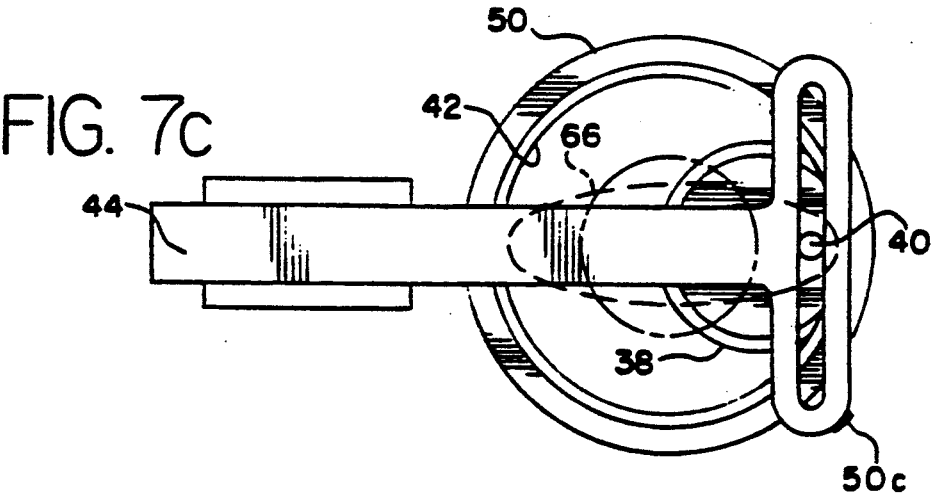

Looking now to FIGS. 7a, 7b and 7c, when the actuator lever 50c is positioned as shown, the relationship between the ring gear and the idler gear will be changed such that the pin 40 will move in the elliptical path 66. The major axis of this elliptical path is parallel with the axis of reciprocation of the plunger 44.

Figure 6A:
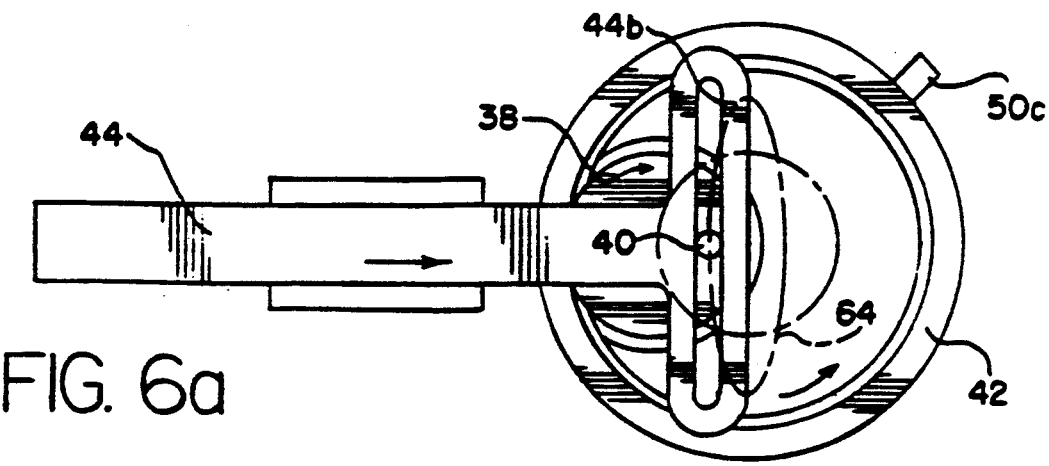
FIGS. 6a, 6b and 6c are sequential plan views in diagrammatic form showing the adjustable stroke mechanism in its configuration for providing the minimum stroke of movement.
Figure 6B:
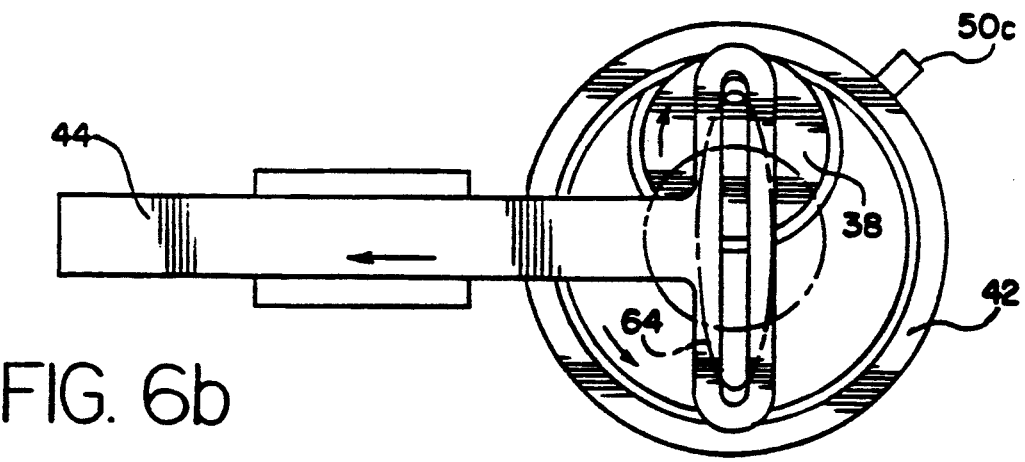
Figure 6C:
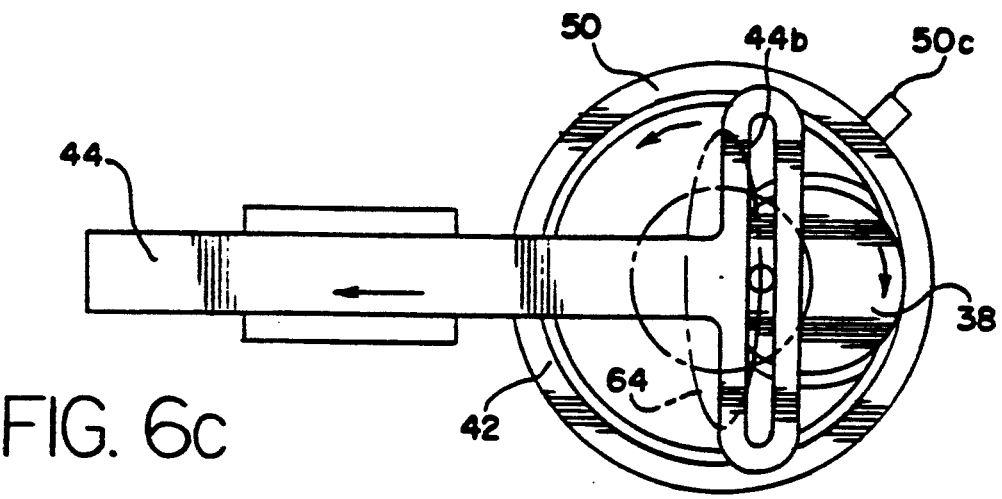

It should be apparent that when the arm 50c is located in the position shown in FIGS. 7a, 7b and 7c, the ram 44 will be reciprocated through its maximum stroke of movement. When the actuator arm 50c is positioned as shown in FIGS. 6a, 6b and 6c, the ram 44 will be reciprocated through its minimum stroke of movement. Positioning of the arm 50c in any one of the intermediate positions defined by the remaining bores 54 will cause the pin 40 to move through intermediate elliptical paths thus varying the stroke of movement of the ram 44 between its minimum and maximum stroke paths. It will be understood that the invention is not to be limited to the seven positions of the embodiment shown for purposes of illustration. Any number of intermediate positions may be provided for as desired.

In the preferred embodiment of the invention shown for purposes of illustration, the actuator plate 50 is mounted for being rotated through 55 degrees. This amount of movement of the actuator plate and the ring gear 42 attached thereto will vary the stroke of the ram 44 from a minimum of $\frac{7}{8}$ to a maximum of $2\frac{1}{2}$. Of course, a 90 degree movement of the ring gear will produce the greatest spread between the maximum stroke and the minimum stroke of the ram 44. This is so because a 90 degree movement of the ring gear will cause a 180 degree change in the position of the idler gear 38 relative to the ring gear 42.

It will be noted, particularly by referring to FIG. 4, that the radial distance X between the axis 26a of the shaft 26 and the axis 36a of the pin 36 is greater than the radial distance Y between the axis 36a and the axis 40a of the pin 40. It is within the scope of the present invention to vary the radial distances of the pins 36 and 40 from the axis 26a such that the X and Y distances will be equal. In that event, when the ring gear 42 is positioned for a minimum amount of reciprocation, the amount of reciprocation would be zero as the crank pin 40 would not move in an elliptical path but would reciprocate in a linear path parallel with the axis 44c (FIG. 5) of the slot 44b. However, upon rotation of the ring gear, the pin 40 would commence reciprocating in a linear path oblique to the axis 44c thus imparting reciprocal movement to the ram 44. Of course, continued rotation of the ring gear would increase the angle between the linear path of movement of the pin 40 and the axis 44c thus increasing the stroke of reciprocation of the ram 40.

Accordingly, if the parts were to be dimensioned to make radical distances X and Y equal, the ram would be reciprocated between zero and a maximum amount upon rotation of the ring gear through 90 degrees. In the preferred embodiment illustrated herein, the minimum stroke of reciprocation is greater than zero such that reciprocal movement will be imparted to the saw blade in all positions of the actuator plate. In any event, it will be appreciated that it is within the scope of the present invention to oscillate the crank pin 40 through elliptical or linear paths depending on the dimensional relationships between distances X and Y.

It will be apparent that as the actuator plate 50 is rotated for varying the stroke of reciprocation of the ram 44 and blade holder 16, foot plate 18 will simultaneously be shifted for being properly positioned for the selected stroke of reciprocation of the blade holder. As explained above, this adjustment of the foot plate is accomplished by the slot 50d which acts as a cam receiving the pin 56 acting as a cam follower.

As mentioned above, it is desirable to locate the foot plate in its optimum position for the selected stroke of reciprocation. In accordance with the present invention, proper adjustment of the foot plate 18 is brought about automatically in response to rotation of the actuator plate 50. In the embodiment of the invention shown for purposes of illustration, the foot plate will be adjusted through a range of approximately ½.

While the invention has been described in connection with a preferred embodiment, it is not intended to limit the scope of the invention to the particular form set forth, but on the contrary, it is intended to cover such alternatives, modifications and equivalents as may be included within the spirit and scope of the invention as defined by the appended claims.

What is claimed is:

1. In a reciprocating saw of the type having a housing containing a motor for reciprocating a blade holder which is adapted to mount a saw blade, the improvement comprising:
   (a) a mechanism for converting oscillating movement to reciprocal movement including a crank pin engaged with a reciprocating member, said reciprocating member being connected to said blade holder;
   (b) a planetary gear system including a ring gear and an idler gear in meshing engagement with each other, said gears being configured such that there is a 2:1 ratio between the ring gear and the idler gear;
   (c) said crank pin being eccentrically mounted on said idler gear;
   (d) a rotary drive member connected to said motor, said rotary drive member eccentrically carrying a drive pin which is concentric with said idler gear and which rotatably mounts the latter on the drive member such that upon rotation of the drive member said drive pin will be moved in a circular path causing said idler gear to be rotated about the axis of said drive pin as the idler gear meshes with the stationary ring gear and also causing said crank pin to be moved in an oscillatory path as the idler gear rotates relative to the ring gear; and
   (e) actuator means connected to said ring gear for shifting said ring gear about its central axis for altering the path of said crank pin thereby to vary the stroke of said blade holder.

2. The improvement according to claim 1 wherein said mechanism is constituted by a scotch yoke mechanism, the yoke of the scotch yoke mechanism including a slot receiving said crank pin.

3. The improvement according to claim 2 wherein said actuator means includes a lever extending exterior of said housing and wherein fastening means are provided for releasably retaining said lever in any one of a number of selected positions.

4. The improvement according to claim 1 wherein the radial distance between the axis of the drive member and the axis of the drive pin is greater than the radial distance between the axis of the latter and the axis of the crank pin whereby elliptical movement is imparted to the crank pin.

5. The improvement according to claim 1 further defined by:
   foot plate and means adjustably mounting
   (a) a foot plate and means adjustably mounting the foot plate from said housing;
   (b) a link having one end thereof connected to said foot plate; and
   (c) camming means connecting the other end of said link with said actuator means such that actuation of the latter to vary the stroke of the blade holder also causes said foot plate to be adjusted to a position corresponding to the selected stroke of movement of the blade holder.

6. The improvement according to claim 5 wherein said actuator plate includes a recess eccentric to the axis of rotation of the actuator plate and wherein a follower is mounted on said other end of the link and is received within said recess, said recess and said follower constituting said camming means.

7. The improvement according to claim 1 wherein said actuator means includes a lever extending exteriorly of said housing and wherein fastening means are provided for releasably retaining said lever in any one of a number of selected positions.

8. The improvement according to claim 2 further defined by:
   (a) a foot plate and means adjustably mounting the foot plate from said housing;
   (b) a link having one end thereof connected to said foot plate; and
   (c) camming means connecting the other end of said link with said actuator means such that actuation of the latter to vary the stroke of the blade holder also causes said foot plate to be adjusted to a position corresponding to the selected stroke of movement of the blade holder.

9. The improvement according to claim 8 wherein said actuator plate includes a recess eccentric to the axis of rotation of the actuator plate and wherein a follower is mounted on said other end of the link and is received within said recess, said recess and said follower constituting said camming means.

10. In a reciprocating drive apparatus for a power tool, a blade holder adapted for connection with a cutting member, a mechanism for converting oscillating movement to reciprocal movement including a crank pin engaged with a reciprocating member connected with said blade holder for reciprocating the latter, a planetary gear system including a ring gear and an idler gear in meshing engagement with each other, said gears being configured such that there is a 2:1 ratio between the ring gear and the idler gear, said crank pin being eccentrically mounted on said idler gear, a rotary drive member eccentrically carrying a drive pin which is concentric with said idler gear and which rotatably mounts the latter can the drive member such that upon rotation of the drive member said drive pin will be moved in a circular path causing said idler gear to be rotated about the axis of said drive pin as the idler gear meshes with the stationary ring gear and also causing said crank pin to be moved in an oscillatory path as the idler gear rotates relative to the ring gear, and actuator means connected to said ring gear for shifting said ring gear about a central axis for altering the path of said crank pin thereby to vary the stroke of said blade holder.

11. The apparatus according to claim 10 wherein said mechanism is constituted by a yoke mechanism, the yoke of the scotch yoke mechanism including a slot receiving said crank pin.

12. The improvement according to claim 10 wherein the radial distance between the axis of the drive member and the axis of the drive pin is greater than the radial distance between the axis of the latter and the axis of the crank pin whereby elliptical movement is imparted to the crank pin.

* * * * *